(12) United States Patent
Boon

(10) Patent No.: US 7,016,544 B2
(45) Date of Patent: Mar. 21, 2006

(54) DIGITAL IMAGE ENCODING AND DECODING METHOD AND DIGITAL IMAGE ENCODING AND DECODING DEVICE USING THE SAME

(75) Inventor: Choong Seng Boon, Moriguchi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 102 days.

(21) Appl. No.: 10/807,061

(22) Filed: Mar. 23, 2004

(65) Prior Publication Data

US 2004/0175050 A1    Sep. 9, 2004

Related U.S. Application Data

(63) Continuation of application No. 09/988,925, filed on Nov. 19, 2001, now Pat. No. 6,771,826, which is a continuation of application No. 09/117,118, filed on Jul. 22, 1998, now Pat. No. 6,415,056.

(30) Foreign Application Priority Data

Jan. 22, 1996 (JP) .................................. 8-008108
May 24, 1996 (JP) .................................. 8-129516

(51) Int. Cl.
*G06K 9/36* (2006.01)

(52) U.S. Cl. ...................... 382/233; 382/232; 382/238; 382/235; 382/241

(58) Field of Classification Search ............... 382/232, 382/233, 238, 235, 293, 241; 345/441; 708/270; 348/413.1
See application file for complete search history.

(56) References Cited

U.S. PATENT DOCUMENTS 4,853,885 A * 8/1989 Naoi et al. ................... 708/270
4,951,140 A * 8/1990 Ueno et al. ............... 348/413.1
5,473,379 A   12/1995 Horne .................... 375/240.16
5,572,605 A * 11/1996 Toraichi ..................... 382/241
5,592,228 A   1/1997  Dachiku et al. ......... 348/416.1
5,995,116 A * 11/1999 Fujimura .................... 345/441

FOREIGN PATENT DOCUMENTS

| CA | 2062965   |   | 1/1991  |
|----|-----------|---|---------|
| JP | 3049373   |   | 3/1991  |
| JP | 4323776   | A | 11/1992 |
| JP | 6-165165  |   | 6/1994  |

(Continued)

OTHER PUBLICATIONS

Kwon, O.J. et al. "Motion Compensated Subband Coding of Video Acquired from a Moving Platform", *Proceedings of the International Conference on Acoustics, Speech, and Signal Processing (ICASSP)*, IEEE, vol. Conf. 20, pp. 2185-2188, May 9, 1995.

(Continued)

*Primary Examiner*—Anh Hong Do
(74) *Attorney, Agent, or Firm*—RatnerPrestia

(57) ABSTRACT

A method for decoding a bitstream data obtained by encoding a target image comprises the steps of:
(a) extracting from the bitstream data, coordinates point date indicating frame coordinates points of the reference image, coordinates number data indicating a number of the frame coordinates points and a compressed image signal related to a target image to be decoded;
(b) selecting an image transformation parameter used for obtaining a predicted image, based on the extracted coordinates number data;
(c) obtaining the predicted image from the reference picture, based on the selected image transformation parameter and the extracted coordinate point data;
(d) obtaining a decompressed differential image by decoding the compressed image signal; and
(e) reproducing a reproduced image by summing the predicted image and the decompressed differential image.

1 Claim, 12 Drawing Sheets

FOREIGN PATENT DOCUMENTS

JP  7050773  2/1995
JP  7-193823  7/1995

OTHER PUBLICATIONS

Adolph, Dirk et al. "1.15 Mbit/s Coding of Video Signals inlcuding Global Motion Compensation", *Signal Processing: Image Communications*, vol. 3, No. 2/3, pp. 259-274, Jun. 1, 1991.

Dugelay, J.L. et al. "Differential Methods for the Identification of 2D and 3D Motion Models in Image Sequences", *Signal Processing: Image Communication*, vol. 7, No. 1, pp. 105-127 Mar. 1, 1995.

Papadopoulos, C.A. et al., "Motion Compensation using $2^{nd}$ Order Geometic Transformations", *Electronics Letters*, vol. 28, No. 25, pp. 2314-2315, Dec. 3, 1992.

European Search Report corresponding to application No. EP 97 90 0472 dated Feb. 20, 2001.

Japanese language search report for Int'l Appl. No. PCT/JP97/00118 dated Apr. 30, 1997.

English Translation of Japanese language search report.

Canadian Office Action for CA 2,244,003, dated Nov. 27, 2003.

* cited by examiner (A)

(B)

(A)

(B)

DIGITAL IMAGE ENCODING AND DECODING METHOD AND DIGITAL IMAGE ENCODING AND DECODING DEVICE USING THE SAME

This application is a continuation of U.S. patent application Ser. No. 09/988,925, filed Nov. 19, 2001, now U.S. Pat. No. 6,771,826, which is a continuation of U.S. patent application Ser. No. 09/117,118, filed Jul. 22, 1998, now U.S. Pat. No. 6,415,056.

FIELD OF THE ENGINEERING

The present invention relates to methods of encoding and decoding a digital picture data for storing or transmitting thereof, more specifically, a method of encoding and decoding the motion information producing predicted pictures, and a method of producing an accurate predicted picture, and an apparatus using the same methods.

BACKGROUND ART

Data compression (=encoding) is required for efficient storing and transmitting of a digital picture.

Several methods of encoding are available as prior arts such as "discrete cosine transform" (DCT) including JPEG and MPEG, and other wave-form encoding methods such as "subband", "wavelet", "fractal" and the like. Further, in order to remove redundant signals between pictures, a prediction method between pictures is employed, and then the differential signal is encoded by wave-form encoding method.

A method of MPEG based on DCT using motion compensation is described here. First, resolve an input picture into macro blocks of 16×16 pixels. One macro block is further resolved into blocks of 8×8, and the blocks of 8×8 undergo DCT and then are quantized. This process is called "Intra-frame coding." Motion detection means including a block matching method detects a prediction macro block having the least errors on a target macro block from a frame which is time sequentially adjoined. Based on the detected motion, an optimal predicted block is obtained by performing motion compensation of the previous pictures. A signal indicating a predicted macro block having the least errors is a motion vector. Next, a difference between the target block and its corresponding predicted block is found, then the difference undergoes DCT, and the obtained DCT coefficients are quantized, which is transmitted or stored together with motion information. This process is called "Inter-frame coding."

At the data receiving side, first, the quantized DCT coefficients are decoded into the original differential signals, next, a predicted block is restored based on the motion vector, then, the differential signal is added to the predicted block, and finally, the picture is reproduced.

A predicted picture is formed in a block by block basis; however, an entire picture sometimes moves by panning or zooming, in this case, the entire picture undergoes motion compensation. The motion compensation or a predicted picture formation involves not only a simple parallel translation but also other deformations such as enlargement, reduction and rotation.

The following equations (1)–(4) express movement and deformation, where (x, y) represents a coordinates of a pixel, and (u, v) represents a transformed coordinates which also expresses a motion vector at (x, y). Other variables are the transformation parameters which indicate a movement or a deformation.

$$(u,v)=(x+e,\ y+f) \quad (1)$$

$$(u,v)=(ax+e,\ dy+f) \quad (2)$$

$$(u,v)=(ax+by+e,\ cx+dy+f) \quad (3)$$

$$(u,v)=(gx^2+pxy+ry^2+ax+by+e,\ hx^2+qxy+sy^2+cx+dy+f) \quad (4)$$

Equation (3) is so called the Affine transform, and this Affine transform is described here as an example. The parameters of the Affine transform are found through the following steps:

First, resolve a picture into a plurality of blocks, e.g., 2×2, 4×4, 8×8, etc., then find a motion vector of each block through block matching method. Next, select at least three most reliable motion vectors from the detected motion vectors. Substitute these three vectors to equation (3) and solve the six simultaneous equations to find the Affine parameters. In general, errors decrease at the greater number of selected motion vectors, and the Affine parameters are found by the least squares method. The Affine parameters thus obtained are utilized to form a predicted picture. The Affine parameters shall be transmitted to the data receiving side for producing the identical predicted picture.

However, when a conventional inter-frame coding is used, a target picture and a reference picture should be of the same size, and the conventional inter-frame coding method is not well prepared for dealing with pictures of different sizes.

Size variations of adjoining two pictures largely depend on motions of an object in these pictures. For instance, when a person standing with his arms down (FIG. 7A) raises the arms, the size of the rectangle enclosing the person changes (FIG. 7B.) When an encoding efficiency is considered, the target picture and reference picture should be transformed into the same coordinates space in order to decrease a coded quantity of the motion vectors. Also, the arrangement of macro blocks resolved from a picture varies depending on the picture size variation. For instance, when the image changes from FIG. 7A to FIG. 7B, a macro block 701 is resolved into macro blocks 703 and 704, which are subsequently compressed. Due to this compression, a vertical distortion resulting from the quantization appears on the person's face in the reproduced picture (FIG. 7B), whereby a visual picture quality is degraded.

Because the Affine transform requires high accuracy, the Affine parameters (a, b, c, d, e, f, etc.) are, in general, real numbers having numbers of decimal places. A considerable amount of bits are needed to transmit parameters at high accuracy. In a conventional way, the Affine parameters are quantized, and transmitted as fixed length codes or variable length codes, which lowers the accuracy of the parameters and thus the highly accurate Affine transform cannot be realized. As a result, a desirable predicted picture cannot be produced.

As the equations (1)–(4) express, the number of transformation parameters ranges from 2 to 10 or more. When a transformation parameter is transmitted with a prepared number of bits enough for maximum numbers of parameters, a problem occurs, i.e., redundant bits are to be transmitted.

DISCLOSURE OF THE INVENTION

The present invention aims to, firstly, provide an encoder and a decoder of a digital picture data for transmitting non-integer transformation parameters of long number of digits, such as the Affine transform, at high accuracy for less amount of coded data. In order to achieve the above objective, a predicted picture encoder comprising the following elements is prepared:

(a) picture compression means for encoding an input picture and compressing the data, (b) coordinates transform means for outputting a coordinates data which is obtained by decoding the compressed data and transforming the decoded data into a coordinates system, (c) transformation parameter producing means for producing transformation parameters from the coordinates data, (d) predicted picture producing means for producing a predicted picture from the input picture by the transformation parameters, and (e) transmission means for transmitting the compressed picture and the coordinates data.

Also a digital picture decoder comprising the following elements is prepared:

(f) variable length decoding means for decoding an input compressed picture data and an input coordinates data, (g) transformation parameter producing means for producing transformation parameters from the decoded coordinates data, (h) predicted picture producing means for producing a predicted picture data using the transformation parameters, (i) addition means for producing a decoded picture by adding the predicted picture and the compressed picture data.

To be more specific, the transformation parameter producing means of the above digital encoder and decoder produces the transformation parameters using "N" (a natural number) pieces of pixels coordinates-points and the corresponding "N" pieces of transformed coordinates-point obtained by applying a predetermined linear polynomial function to the N pieces of pixels coordinates-points. Further, the transformation parameter producing means of the above digital encoder and decoder outputs transformation parameters produced through the following steps: first, input target pictures having different sizes and numbered "1" through "N", second, set a common spatial coordinates for the above target pictures, third, compress the target pictures to produce compressed pictures thereof, then, decode the compressed pictures and transform them into the common spatial coordinates, next, produce expanded (decompressed) pictures thereof and store them, and at the same time, transform the expanded pictures into the common spatial coordinates.

The present invention aims to, secondly, provide a digital picture encoder and decoder. To be more specific, when pictures of different sizes are encoded to form a predicted picture, the target picture and reference picture are transformed into the same coordinates space, and the coordinates data thereof is transmitted, thereby increasing accuracy of detecting a motion and at the same time, reducing the amount of coded quantity for improving picture quality.

In order to achieve the above objective, the predicted picture encoder according to the present invention performs the following steps: first, input target pictures having different sizes and numbered "1" through "N", second, set a common space coordinates for the above target pictures, third, compress the target pictures to produce compressed pictures thereof, then, decode the compressed pictures and transform them into the common spatial coordinates, next, produce expanded pictures thereof and store them, and at the same time, transform the expanded pictures into the common spatial coordinates, thereby producing a first off-set signal (coordinates data), then encode this off-set signal, and transmit it together with the first compressed picture.

The predicted picture encoder according to the present invention further performs the following steps with regard to the "n"th (n=2, 3, . . . N) target picture after the above steps: first, transform the target picture into the common spatial coordinates, second, produce a predicted picture by referring to an expanded picture of the (n−1)th picture, third, produce a differential picture between the "n"th target picture and the predicted picture, and then compress it to encode, thereby forming the "n"th compressed picture, then, decode the "n"th compressed picture, next, transform it into the common spatial coordinates to produce the "n"th expanded picture, and store it, at the same time, encode the "n"th off-set signal (coordinates data) which is produced by transformation the "n"th target picture into the common space coordinates, finally transmit it together with the "n"th compressed picture.

The predicted picture decoder of the present invention comprises the following elements: input terminal, data analyzer (parser), decoder, adder, coordinates transformer, motion compensator and frame memory. The predicted picture decoder of the present invention performs the following steps: first, input compressed picture data to the input terminal, the compressed picture data being numbered from 1 to N including the "n"th off-set signal which is produced by encoding the target pictures having respective different sizes and being numbered 1 to N, and transforming the "n"th (n=1, 2, 3, . . . N) target picture into the common spatial coordinates, second, analyze the first compressed picture data, and output the first compressed picture signal together with the first off-set signal, then input the first compressed picture signal to the decoder to decode it to the first reproduced picture, and then, the first reproduced picture undergoes the coordinates transformer using the first off-set signal, and store the transformed first reproduced picture in the frame memory. With regard to the "n"th (n=2, 3, 4, . . . N) compressed picture data, first, analyze the "n"th compressed picture data in the data analyzer, second, output the "n"th compressed picture signal, the "n"th off-set signal and the "n"th motion signal, third, input the "n"th compressed picture signal to the decoder to decode it into the "n"th expanded differential picture, next, input the "n"th off-set signal and "n"th motion signal to the motion compensator, then, obtain the "n"th predicted picture from the "n-1"th reproduced picture stored in the frame memory based on the "n"th off-set signal and "n"th motion signal, after that, in the adder, add the "n"th expanded differential picture to the "n"th predicted picture to restore then into the "n"th reproduced picture, and at the same time, the "n"th reproduced picture undergoes the coordinates transformer based on the "n"th off-set signal and is stored in the frame memory.

The present invention aims to, thirdly, provide a digital picture encoder and decoder which can accurately transmit the coordinates data including the transformation parameters having the Affine parameter for the Affine transform, and can produce an accurate predicted picture.

A digital picture decoder according to the present invention comprises the following elements: variable length decoder, differential picture expander, adder, transformation parameter generator, predicted picture generator and frame memory.

The above digital picture decoder performs the following steps: first, input data to the variable length decoder, second, separate a differential picture data and transmit it to the differential picture expander, at the same time, separate the coordinates data and send it to the transformation parameter generator, thirdly, in the differential picture expander, expand differential picture data, and transmit it to the adder, next, in the transformation parameter generator, produce the transformation parameters from the coordinates data, and transmit it to the predicted picture generator, then, in the predicted picture generator, produce the predicted picture using the transformation parameters and the picture input from the frame memory, and transmit the predicted picture to the adder, where the predicted picture is added to the expanded differential picture, finally, produce the picture to output, at the same time, store the picture in the frame memory.

The above coordinates data represent either one of the following cases:
(a) the coordinates points of N pieces of pixels and the corresponding N pieces of transformed coordinates points obtained by applying the predetermined linear polynomial function to the coordinates points of N pieces of pixels, or
(b) a differential value between the coordinates points of N pieces of pixels and the corresponding N pieces of transformed coordinates points obtained by applying the predetermined linear polynomial to the coordinates points of the N pieces of pixels, or
(c) N pieces of transformed coordinates points obtained by applying a predetermined linear polynomial to predetermined N pieces for each of the coordinates points, or
(d) differential values between the N pieces of transformed coordinates points obtained by applying the predetermined linear polynomial function to predetermined N pieces of coordinates point and predicted values. These predicted values represent the predetermined N pieces coordinates points, or N pieces transformed coordinates points of the previous frame.

A digital picture encoder according to the present invention comprises the following elements: transformation parameter estimator, predicted picture generator, first adder, differential picture compressor, differential picture expander, second adder, frame memory and transmitter.

The above digital picture encoder performs the following steps: first, input a digital picture, second, in the transformation parameter estimator, estimate each of the transformation parameters using the picture stored in the frame memory and the digital picture, third, input the estimated transformation parameters together with the picture stored in the frame memory to the predicted picture generator, next, produce a predicted picture based on the estimated transformation parameters, then in the first adder, find a difference between the digital picture and the predicted picture, after that, in the differential picture compressor, compress the difference into compressed differential data, then transmit the data to the transmitter, at the same time, in the differential picture expander, expand the compressed differential data into an expanded differential data, then, in the second adder, the predicted picture is added to the expanded differential data, next, store the added result in the frame memory. To be more specific, the coordinates data is transmitted from the transformation parameter estimator to the transmitter, and they are transmitted together with the compressed differential data.

The above coordinates data comprises either one of the following cases:
(a) the coordinates points of N pieces of pixels and the corresponding N pieces of transformed coordinates points obtained by applying transformation using the transformation parameters, or
(b) the coordinates points of N pieces of pixels as well as each of the differential values between the coordinates points of N pieces of pixels and the N pieces of transformed coordinates points, or
(c) N pieces of coordinates points transformed from each of the predetermined N pieces coordinates points of pixels, or
(d) each of the differential values between the N pieces of coordinates points transformed from the predetermined N pieces coordinates points of pixels, or
(e) each of the differential values between N pieces transformed coordinates points and those of a previous frame.

A digital picture decoder according to the present invention comprises the following elements: variable length decoder, differential picture expander, adder, transformation parameter generator, predicted picture generator and frame memory.

The above digital picture decoder performs the following steps: first, input data to the variable length decoder, second, separate a differential picture data and transmit it to the differential picture expander, at the same time, input the number of coordinates data together with the coordinates data to the transformation parameter generator, thirdly, in the differential picture expander, expand differential picture data, and transmit it to the adder, next, in the transformation parameter generator, change transformation parameter generation methods depending on the number of the transformation parameters, then, produce the transformation parameters from the coordinates data, and transmit it to the predicted picture generator, then, in the predicted picture generator, produce the predicted picture using the transformation parameters and the picture input from the frame memory, and transmit the predicted picture to the adder, where the predicted picture is added to the expanded differential picture, finally, produce the picture to output, at the same, store the picture in the frame memory.

The above coordinates data represent either one of the following cases:
(a) the coordinates points of N pieces of pixels and the corresponding N pieces of transformed coordinates points obtained by transforming the coordinates points of N pieces of pixels by using the predetermined linear polynomial function, or
(b) the coordinates points of N pieces of pixels and each of the differential values between the coordinates points of N pieces of pixels and the corresponding N pieces of transformed coordinates points obtained by transforming the coordinates points of N pieces of pixels by using the predetermined linear polynomial function, or
(c) the N pieces of coordinates points transformed from the predetermined N pieces of coordinates points by the predetermined linear polynomial, or
(d) differential values between the coordinates points of N pixels and the coordinates points of N pieces of pixels of the previous frame, and differential values of the N pieces of transformed coordinates points obtained by the predetermined linear polynomial and the N pieces transformed coordinates points in the previous frame, or
(e) N pieces of coordinates points transformed from the predetermined N pieces coordinates points by the predetermined linear polynomial, or
(f) differential values between the N pieces of coordinates points transformed from the predetermined N pieces of coordinates points by the predetermined linear polynomial and the predetermined N pieces coordinates points, or (g) differential values between the N pieces of coordinates points transformed from the predetermined N pieces coordinates points by the predetermined linear polynomial and those in the previous frame.

When the transformation parameters are transmitted, the transformation parameters are multiplied by the picture size, and then quantized before the transformation parameter is encoded, or an exponent of the maximum value of transformation parameter is found, and the parameters are normalized by the exponent, then the normalized transformation parameters together with the exponent are transmitted.

DETAILED DESCRIPTION OF THE PREFERRED EMBODIMENTS

The exemplary embodiments of the present invention are detailed hereinafter by referring to FIGS. 1–12.

(Embodiment 1)

Figure 1:
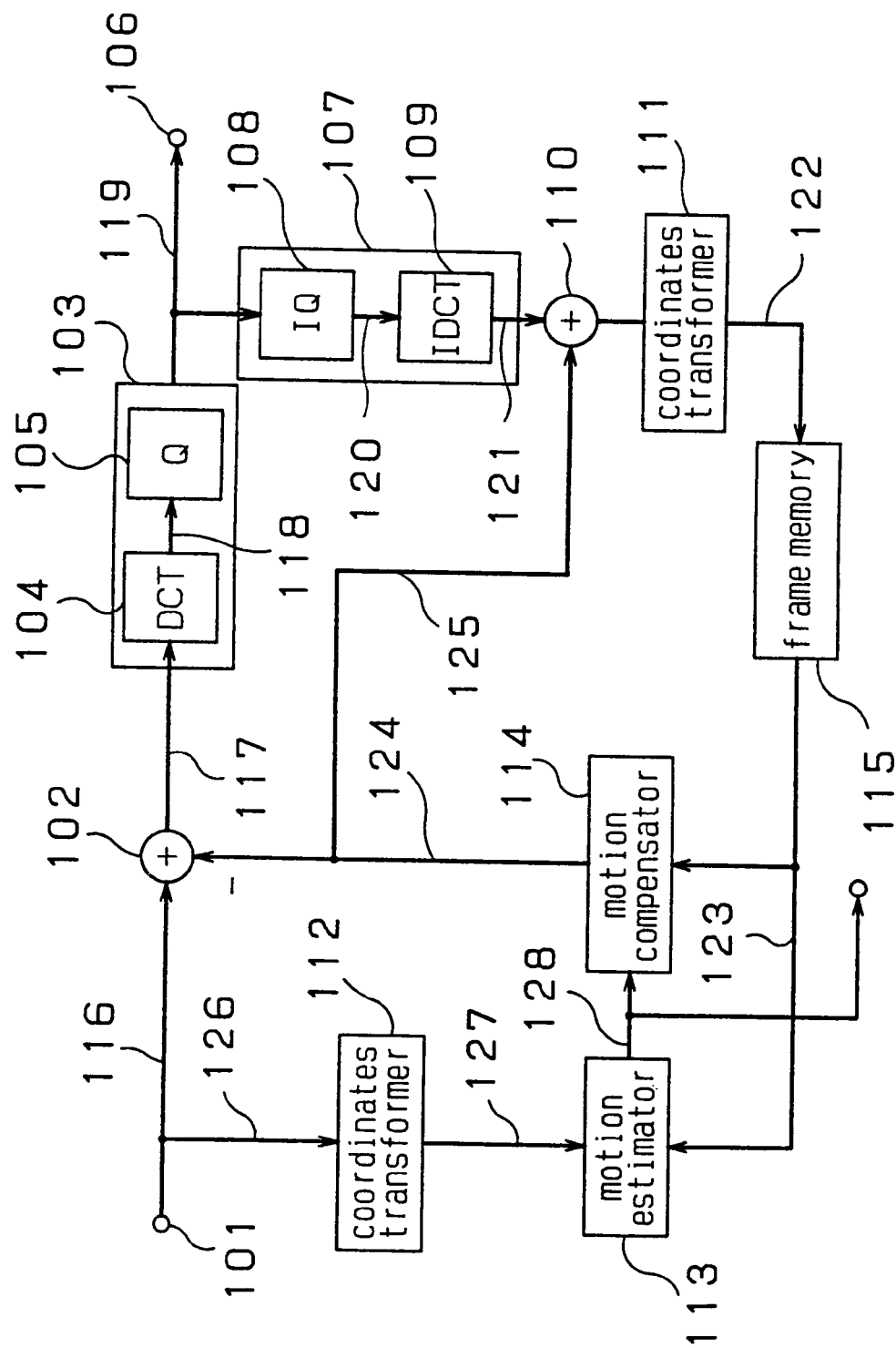
FIG. 1 is a block diagram depicting a predicted picture encoder according to the present invention.
Figure 2:
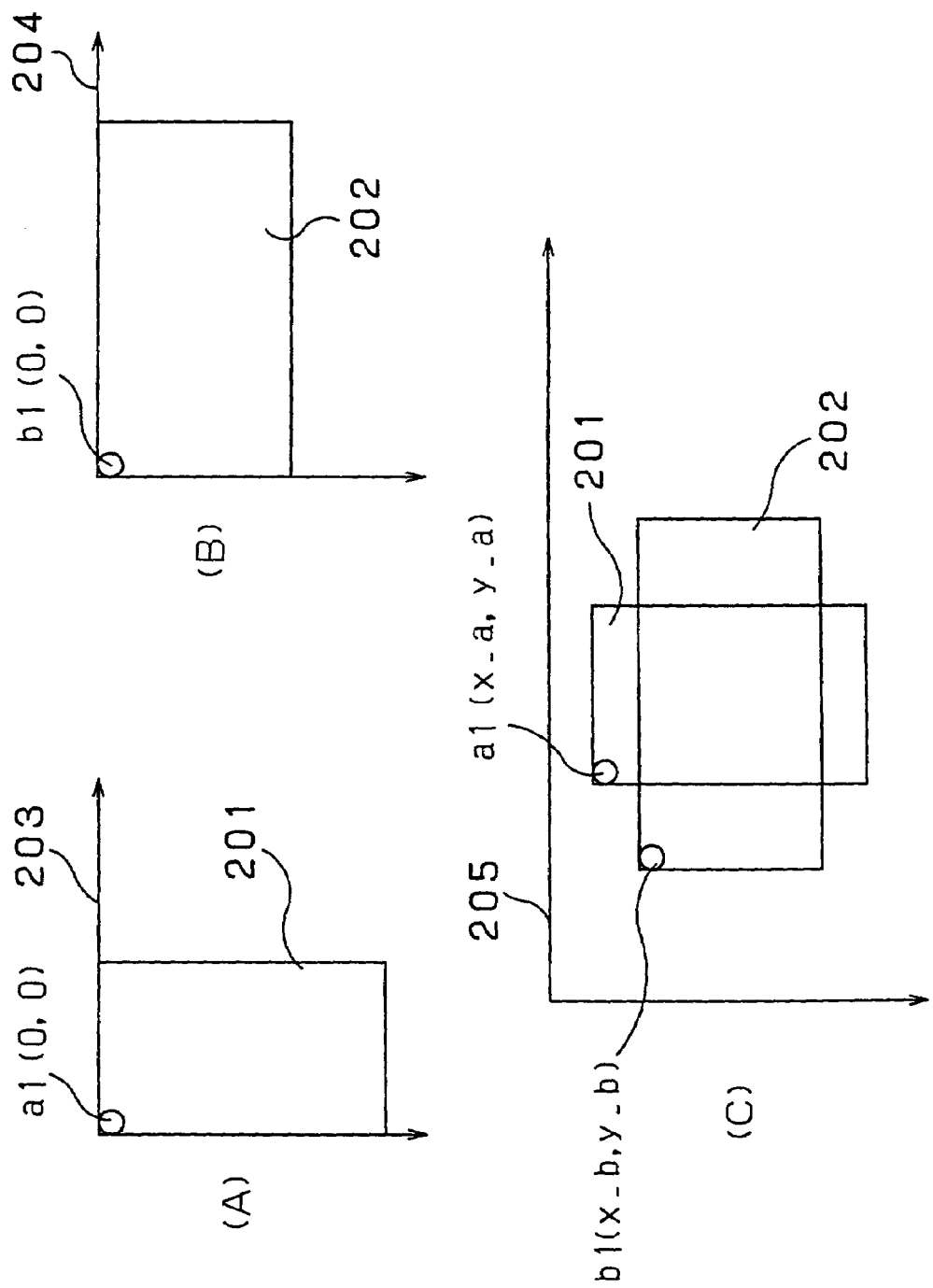
FIG. 2 is a first schematic diagram depicting a coordinates transform used in a first and a second exemplary embodiments of the present invention.

FIG. 1 is a block diagram depicting a predicted picture encoder according to the present invention. FIG. 1 lists the following elements: input terminal 101, first adder 102, encoder 103, output terminal 106, decoder 107, second adder 110, first coordinates transformer 111, second coordinates transformer 112, motion detector 113, motion compensator 114, and frame memory 115.

The predicted picture encoder having the above structure operates as follows:

(a) Input the target pictures numbered 1-N and having respective different sizes into the input terminal 101, where N is determined depending on a video length. First of all, input the first target picture to the input terminal 101, via the first adder 102, the first target picture is compressed in the encoder 103. In this case, the first adder 102 does not perform a subtraction. In this exemplary embodiment, the target picture is resolved into a plurality of adjoining blocks (8×8 pixels), and a signal in spatial domain is transformed into frequency domain to form a transformed block by discrete cosine transform (DCT) 104. The transformed block is quantized by a quantizer 105 to form a first compressed picture, which is output to the output terminal 106. This output is converted into fixed length codes or variable length codes and then transmitted (not shown.) At the same time, the first compressed picture is restored into an expanded picture by the decoder 107.

(b) In this exemplary embodiment, the first compressed picture undergoes an inverse quantizer IQ 108 and an inverse discrete cosine transformer (IDCT) 109 to be transformed eventually to spatial domain. A reproduced picture thus obtained undergoes the first coordinates transformer 111 and is stored in the frame memory 115 as a first reproduced picture.

(c) The first coordinates transformer 111 is detailed here. FIG. 2A is used as the first target picture. A pixel "Pa" of a picture 201 has a coordinates point (0, 0) in the coordinates system 203. Another coordinates system 205 is established in FIG. 2C, which may be a coordinates system of display window or that of the target picture of which center is the origin of the coordinates system. In either event, the coordinates system 205 should be established before encoding is started. FIG. 2C shows a mapping of the target picture 201 in the coordinates system 205. The pixel "Pa" of the target picture 201 is transformed into (x_a, y_a) due to this coordinates transform. The coordinates transform sometimes includes a rotation. The value of x_a, y_a is encoded into a fixed length and in 8 bit form, then it is transmitted with the first compressed picture.

(d) Input the "n"th (n=2, 3 . . . , N) target picture to the input terminal 101. Input the "n"th target picture into the second coordinates transformer 112 via a line 126, and transform it into the coordinates system 205. A picture 202 in FIG. 2B is used as the "n"th target picture. Map this target picture in the coordinates system 205, and transform the coordinates point of pixel "b1" into (x_b, y_b) as shown in FIG. 2C. Then, input the target picture 202 undergone the coordinates transform into the motion detector 113, and resolve it to a plurality of blocks, then detect a motion using a block matching method or others by referring to the "n−1"th reproduced picture, thereby producing a motion vector. Next, output this motion vector to a line 128, and encode it to transmit (not shown), at the same time, send it to the motion compensator 114, then, produce a predicted block by accessing the "n−1"th reproduced picture stored in the frame memory 115. Examples of the motion detection and motion compensation are disclosed in U.S. Pat. No. 5,193,004.

(e) Input the blocks of the "n"th target picture and the predicted blocks thereof into the first adder 102, and produce the differential blocks. Next, compress the differential blocks in the encoder 103, then produce the "n"th compressed picture and outputs it to the output terminal 106, at the same time, restore it to an expanded differential block in the decoder 107. Then, in the second adder 110, add the predicted block sent through a line 125 to the expanded differential block, thereby reproducing the picture. Input the picture thus reproduced to the first coordinates transformer 111, and apply the coordinates transform to the picture as same as the picture 202 in FIG. 2C, and store it in the frame memory 115 as the "n"th reproduced picture, at the same time, encode the coordinates point (x_b, y_b) of the pixel "b1", and transmit this encoded data together with the "n"th compressed picture.

Figure 3:
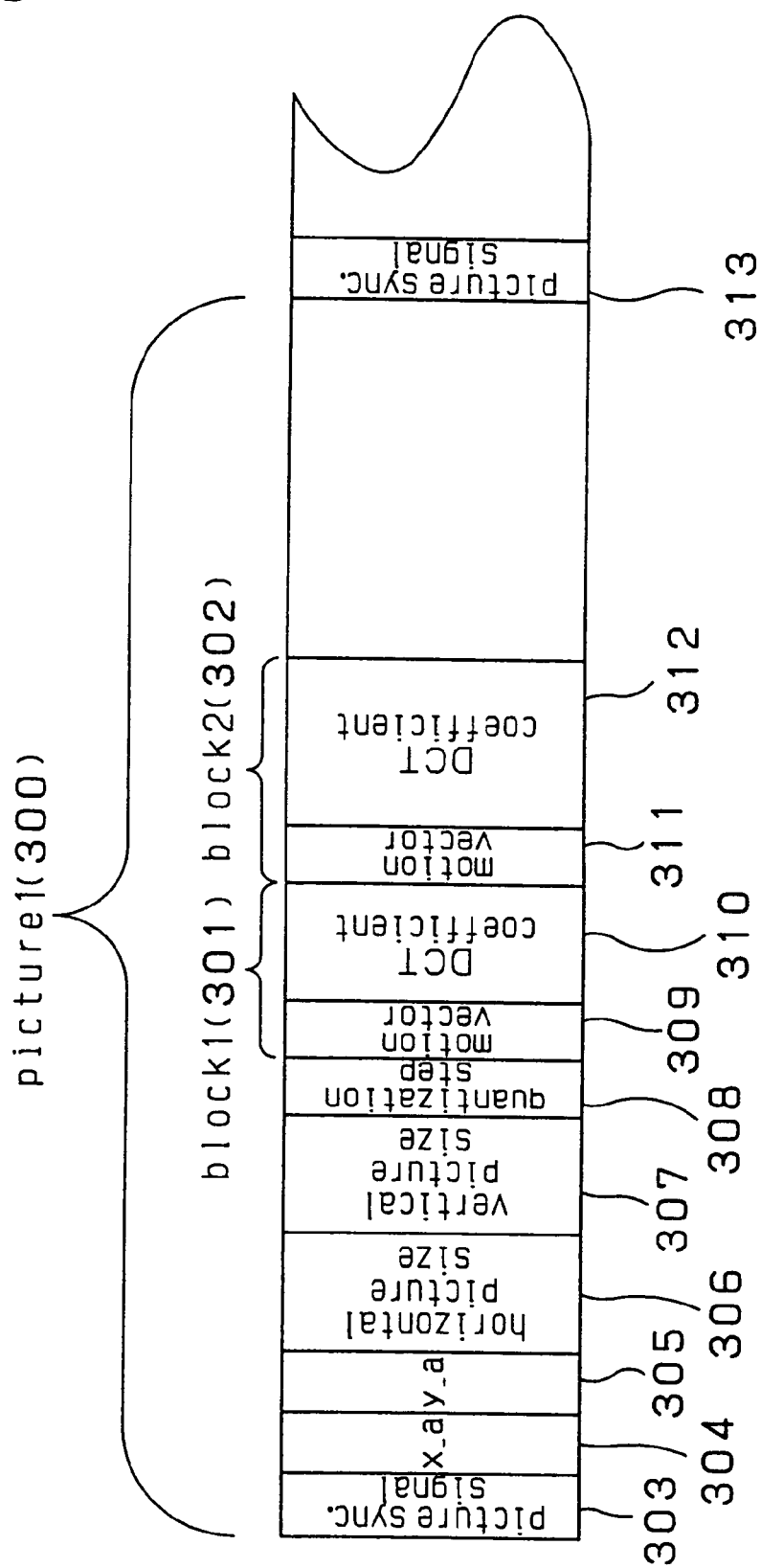
FIG. 3 is a bit stream depicting encoded picture data by a predicted picture encoder used in the first exemplary embodiment of the present invention.

(f) FIG. 3 is a bit stream depicting encoded picture data by a predicted picture encoder used in the exemplary embodiment of the present invention. On the top of the encoded picture data, a picture sync. signal 303 exists, next is a parameter x_a 304, y_a 305 undergone the coordinates transform, then picture size 306, 307, and a step value 308 used for quantization, after that the compressed data and the motion vector follow. In other words, the parameter x_a 304, y_a 305 and picture size 306, 307 are transmitted as a coordinates data.

Figure 4:
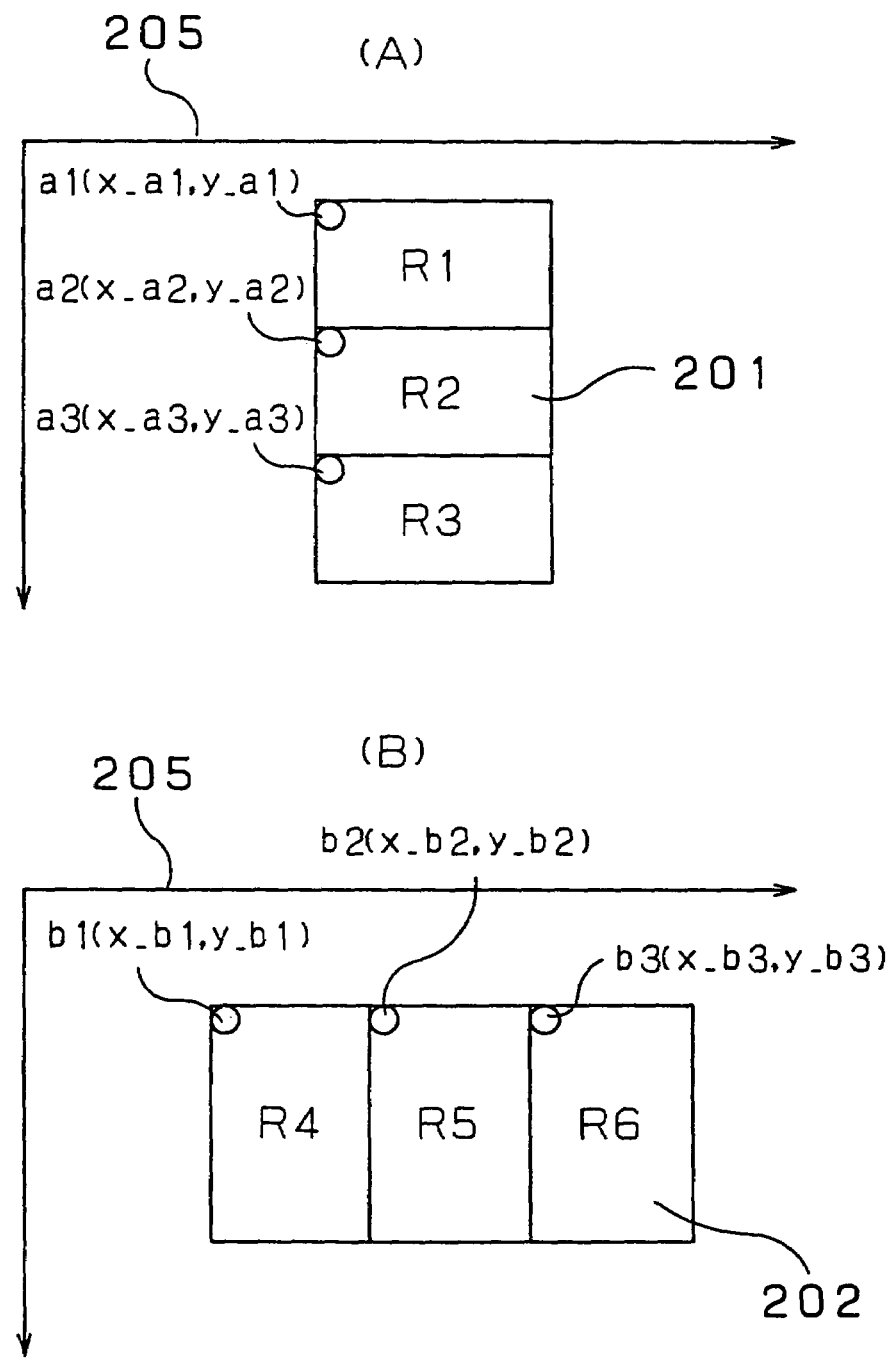
FIG. 4 is a second schematic diagram depicting coordinates transform used in the first and second exemplary embodiments.

(g) FIG. 4 shows another mode of coordinates transform used in the exemplary embodiments of the present invention. In this case, resolve the target picture into a plurality of regions, and apply the coordinates transform to each region. For instance, resolve the picture 201 into three regions, R1, R2, and R3, then, compress and expand each region, after that, apply the coordinates transform to each reproduced R1, R2 and R3 in the first coordinates transformer 111, then store them in the frame memory 115. Encode parameters (x_a1, y_a1), (x_a2, y_a2), and (x_a3, y_a3) to be used in the coordinates transform simultaneously, and transmit the encoded parameters.

(h) Input the picture 202, and resolve it into regions R4, R5 and R6. Apply the coordinates transform to each region in the second coordinates transformer 112. Each transformed region undergoes the motion detector and motion compensator by referring the regions stored in the frame memory 115, then produce a predicted signal, and produce a differential signal in the first adder 102, next, compress and expand the differential signal, and add the predicted signal thereto in the second adder. Each region thus reproduced undergoes the coordinates transform and is stored in the frame memory 115. Encode parameters (x_b1, y_b1), (x_b2, y_b2), and (x_b3, y_b3) to be used in the coordinates transform simultaneously and transmit them.

Pictures of different sizes are transformed into a common spatial coordinates, thereby increasing an accuracy of motion detection and reducing coded quantity of the motion vector, as a result, picture quality is improved. The coordinates of pictures in FIGS. 6A and 6B align at point 605, whereby motion can be correctly detected because the blocks 601 and 603 are identical, and 602 and 604 are identical. Further in this case, the motion vectors of blocks 603 and 604 are nearly zero, thereby reducing the coded quantity of the motion vector. In general, the same manner is applicable to two adjoining pictures. As opposed to FIG. 7B, since the face drawn in the block 603 in FIG. 6B is contained within one block, a vertical distortion resulting from quantization does not appear on the face.

(Embodiment 2)

Figure 5:
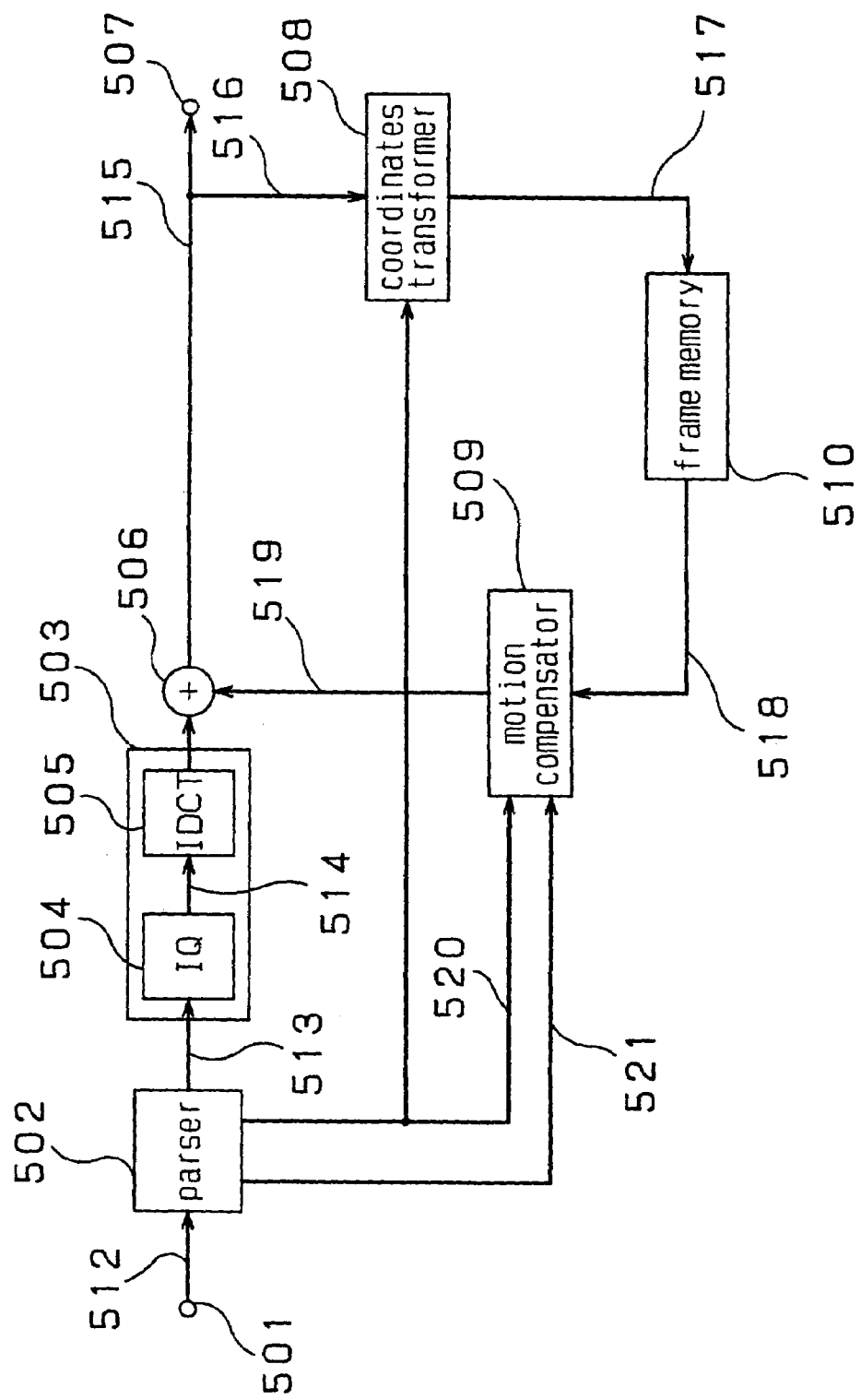
FIG. 5 is a block diagram depicting a predicted picture decoder used in the second exemplary embodiment of the present invention.
Figure 6:
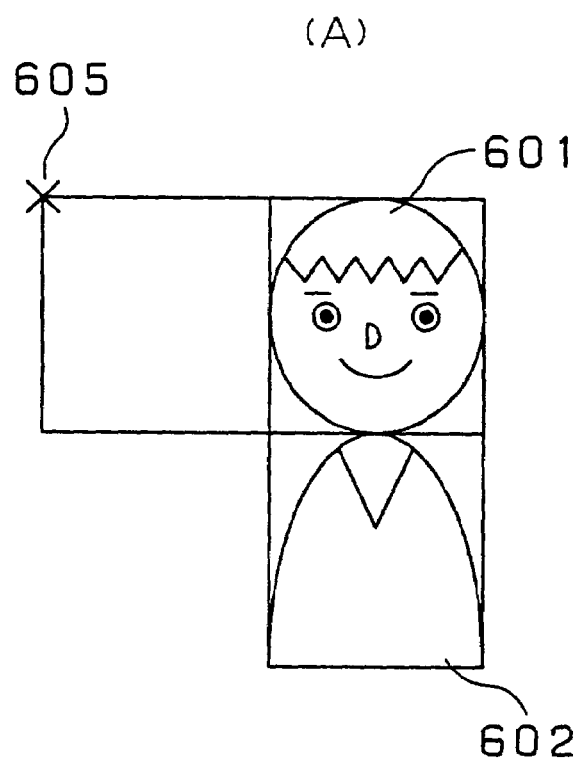
FIG. 6 is a schematic diagram depicting a resolved picture in the first and second exemplary embodiment.
Figure 6:
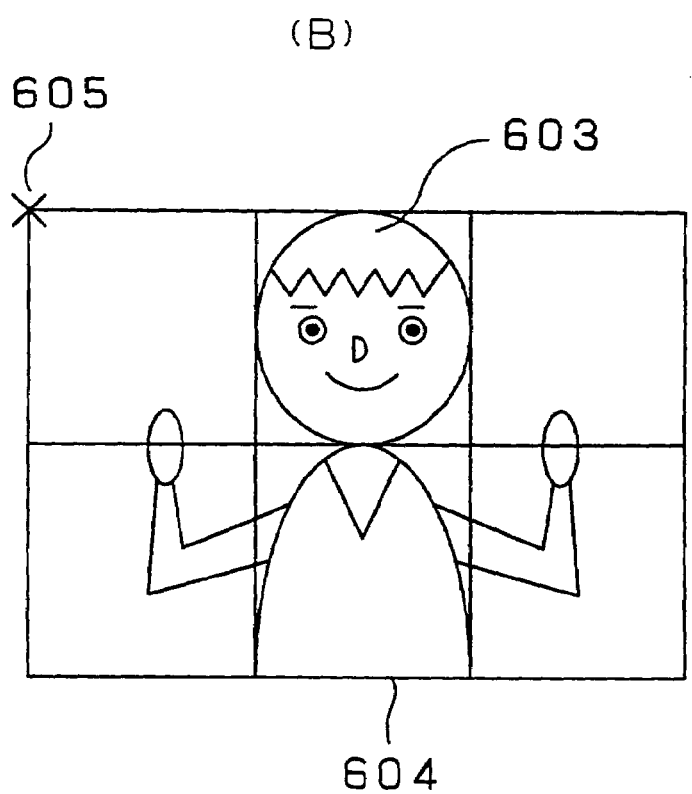
Figure 7:
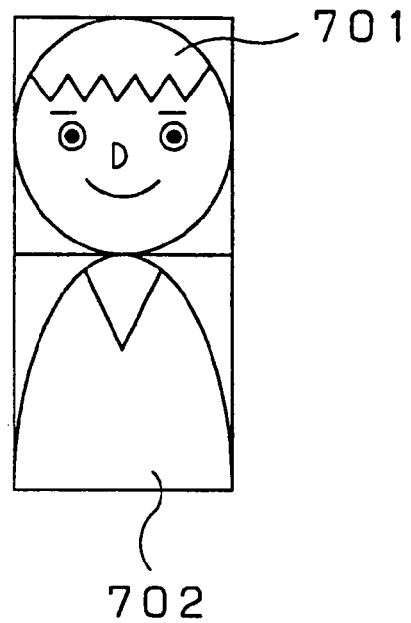
FIG. 7 is a schematic diagram depicting a picture resolved by a conventional method.
Figure 7:
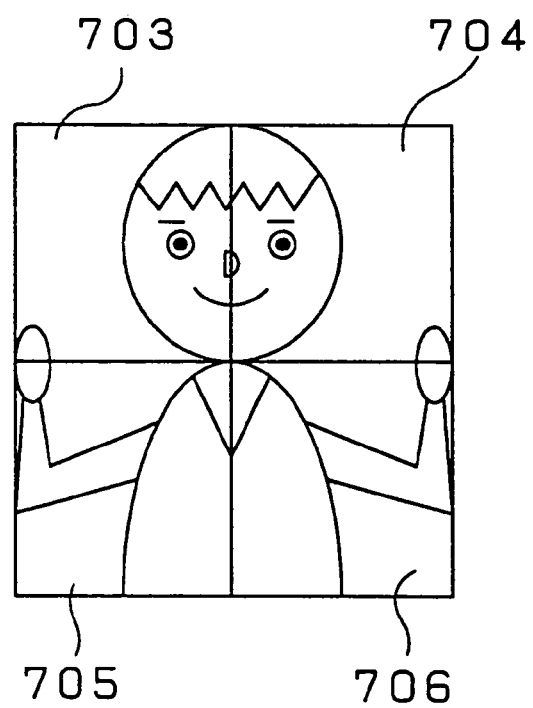

FIG. 5 is a block diagram depicting a predicted picture decoder used in the second exemplary embodiment of the present invention. FIG. 5 lists the following elements: input terminal 501, data analyzer 502, decoder 503, adder 506, output terminal 507, coordinates transformer 508, motion detector 509, frame memory 510.

An operation of the predicted picture encoder comprising the above element is described here. First, to the input terminal 501, input compressed picture data and numbered 1 through N including a "n"th transformation parameter which is produced by encoding target pictures having respective different sizes and numbered 1 through N and transforming the "n"th (n=1, 2, 3, . . . , N) target picture into a common spatial coordinates. FIG. 3 is a bit stream depicting an example of compressed picture data. Second, analyze the input compressed picture data by the data analyzer 502.

Analyze the first compressed picture data by the data analyzer 502, and then, output the first compressed picture to the decoder 503. Send first transformation parameters (x_a, y_a, as shown in FIG. 2C), which is produced by transforming the first picture into the common space coordinates, to the coordinates transformer 508. In the decoder 503, decode the first compressed picture to an expanded picture, and then output it to the output terminal 507, at the same time, input the expanded picture to the coordinates transformer 508. In this second embodiment, the expanded picture undergoes an inverse quantization and IDCT before being restored to a signal of the spatial domain. In the coordinates transformer 508, map the expanded picture in the common spatial coordinates system based on the first transformation parameter, and then, output it as a first reproduced picture, and store this in the frame memory 510. Regarding the coordinates transform, the same method as in the first embodiment is applied to this second embodiment.

Next, analyze the "n"th (n=2, 3, 4, . . . , N) compressed picture data by the data analyzer 502, and output the "n"th differential compressed picture to the decoder 503. Send the "n"th motion data to the motion compensator 509 via a line 521. Then, send the "n"th transformation parameter (x_b, y_b, as shown in FIG. 2C), which is produced by transforming the "n"th picture into the common spatial coordinates, to the coordinates transformer 508 and the motion compensator 509 via a line 520. In the decoder 503, restore the "n"th differential compressed picture to the "n"th expanded differential picture, and output this to the adder 506. In this second embodiment, a differential signal of the target block undergoes the inverse quantization and IDCT, and is output as an expanded differential block. In the motion compensator 509, a predicted block is obtained from the frame memory 510 using the "n"th transformation parameters and the motion vector of the target block. In this second embodiment, the coordinates of the target block is transformed using the transformation parameter. In other words, add the transformation parameter (e.g., x_b, y_b, as shown in FIG. 2C) to the coordinates of the target block, and add the motion vector to this sum, thereby determine an address in the frame memory 510. Send the predicted block thus obtained to the adder 506, and is added to the expanded differential block, thereby reproduce the picture. Then, output the reproduced picture to the output terminal 507, at the same time, the reproduced picture undergoes the coordinates transformer 508 using the "n"th transformation parameter, and is stored in the frame memory 510. The coordinates transformer 508 can be replaced by the motion compensator 509 or other apparatuses which has the following function: Before and after the target block, add a difference between the parameters of the "n"th picture and "n-1"th picture, i.e., (x_b-x_a, y_b-y_a) to the target block, and to this sum, add the motion vector. Instead of the coordinates transformer 508, the address in the frame memory 510 can be determined using one of the above alternatives.

A case where another compressed picture data is input to the input terminal 501 is discussed hereinafter; Input compressed pictures data numbered 1 through N including transformation parameters which can be produced by resolving the target pictures numbered 1 through N having respective different sizes into a respective plurality of regions, and encoding each region, then transforming respective regions into the common spatial coordinates.

First, analyze a first compressed picture data in the data analyzer 502, and output the "m"th (m=1, 2, . . . , M) compressed region to the decoder 503. In FIG. 4A, this is exampled by M=3. Then, send the "m"th transformation parameter (x_am, y_am, as shown in FIG. 4A), which is produced by transforming the "m"th compressed region into the common spatial coordinates, to the coordinates transformer 508 via a line 520. In the decoder 503, restore the "m"th compressed region to the "m"th expanded region, and then, output this to the output terminal 507, at the same time, input the "m"th expanded region to the coordinates transformer 508. Map the "m"th expanded region in the common space coordinates system based on the "m"th transformation parameter, and output this as the "m"th reproduced region, finally store the reproduced region in the frame memory 510. The method is same as the previous one.

Second, analyze the "n"th (n=1. 2. 3. . . . , N) compressed picture data in the data analyzer 502, and output the "k"th (k=1, 2, . . . , K) differential compressed region in the data to the decoder 503. In FIG. 4B, this is exampled by K=3. Also send the corresponding motion data to the motion detector 509 via a line 521, then transform the data into the common spatial coordinates, thereby producing the "k"th transformation parameter (x_bk, y_bk, k=1, 2, 3 in FIG. 4B). Send this parameter to the coordinates transformer 508 and the motion compensator 509 via the line 520. In the decoder 503, restore the "k"th differential compressed region to an expanded differential region, and then output it to the adder 506. In this second embodiment, the differential signal of the target block undergoes an inverse quantization and IDCT before being output as an expanded differential block. In the motion compensator 509, a predicted block is obtained from the frame memory 510 using the "k"th transformation parameter and the motion vector of the target block. In this second embodiment, a coordinates of the target block is transformed using the "k"th transformation parameter. In other words, add the transformation parameter (e.g., x_bk, y_bk, as shown in FIG. 4B) to the coordinates of the target block, and add the motion vector to this sum, thereby determine an address in the frame memory 510. Send the predicted block thus obtained to the adder 506, and is added to the expanded differential block, thereby reproduce the picture. Then, output the reproduced picture to the output terminal 507, at the same time, the reproduced picture undergoes the coordinates transformer 508, and is stored in the frame memory 510.

(Embodiment 3)

Figure 8:
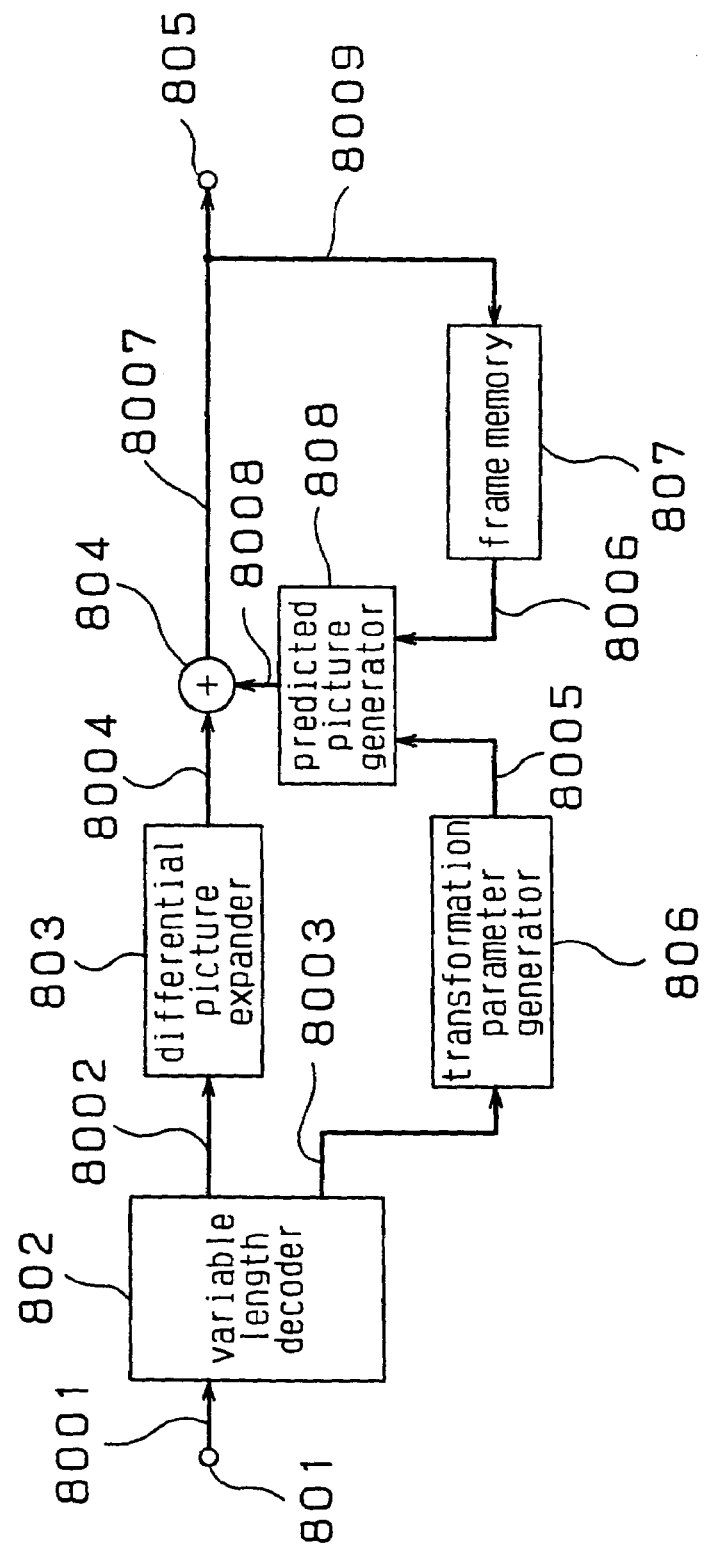
FIG. 8 is a block diagram depicting a digital picture decoder used in the third exemplary embodiment.

FIG. 8 is a block diagram depicting a decoder utilized in this third exemplary embodiment. The decoder comprises the following elements: input terminal 801, variable length decoding part 802, differential picture expanding part 803, adding part 804, output terminal 805, transformation parameter producing part 806, frame memory 807 and predicted picture producing part 808.

First, input a compressed picture data to the input terminal 801, second, in the variable length decoding part 802, analyze the input data and separate differential picture data as well as coordinates data from the input data, third, send these separated data to the differential picture expanding part 803 and the transformation parameter producing part 806 via lines 8002 and 8003 respectively. The differential picture data includes a quantized transformed (DCT) coefficients and a quantization stepsize (scale). In the differential picture expanding part 803, apply an inverse quantization to the transformed DCT coefficients using the quantization stepsize, and then, apply an inverse DCT thereto for expanding to the differential picture.

The coordinates data include the data for producing transformation parameters, and the transformation parameters are produced by the transformation parameter producing part 806, e.g., in the case of the Affine transform expressed by the equation (3), parameters a, b, c, d, e, and f are produced, which is detailed hereinafter.

First, input the transformation parameters produced by the transformation parameter producing part 806 and the picture to be stored in the frame memory into the predicted picture producing part 808. In the case of the Affine transform expressed by the equation (3), the predicted value for a pixel at (x, y) is given by a pixel at (u, v) of the image stored in the frame memory according to equation (3) using the transformation parameters (a, b, c, d, e, f sent from the transformation parameter producing part 806. The same practice can be applicable to the equation (1), (2), and (4).

Send the predicted picture thus obtained to the adding part 804, where a differential picture is added to, then, reproduce the picture. Output the reproduced picture to the output terminal 805, at the same time, store the reproduced picture in the frame memory 807.

The coordinates data described above can be in a plural form, which is discussed here.

Hereinafter the following case is discussed: a coordinates data comprises the coordinates points of "N" pieces of pixels, and the "N" pieces coordinates points transformed by the predetermined linear polynomial, where "N" represents a number of points required for finding transformation parameters. In the case of the Affine parameter, there are six parameters, thus six equations are needed to solve six variables. Since one coordinates point has (x, y) components, six Affine parameters can be solved in the case of N=3. N=1, N=2 and N=5 are applicable to the equation (1), (2) and (4) respectively. The "N" pieces of transformed coordinates points are motion vectors and correspond to the (u, v) components on the left side of equation (4).

In the case of the Affine transform, three coordinates points i.e., (x0, y0), (x1, y1) and (x2, y2), and three transformed coordinates points, i.e., (u0, v0), (u1, v1) and (u2, v2) are input into the transformation parameter producing part 806 via a line 8003. In the transformation parameter producing part 806, the Affine parameter can be obtained by solving the following simultaneous equations.

$$(u0, v0)=(ax0+by0+e, cx0+dy0+f)$$

$$(u1, v1)=(ax1+by1+e, cx1+dy1+f) \quad (5)$$

$$(u2, v2)=(ax2+by2+e, cx2+dy2+f)$$

The transformation parameters can be obtained using more coordinates data. For other cases, given be equations (1), (2) and (4), the transformation parameters can be solved in the same manner. To obtain the transformation parameters at high accuracy, the N coordinates points (x, Y) have to appropriately chosen. Preferably the N points are located perpendicular between each other.

When the coordinates points (x0, y), (x1, yl) and (x2, y2) are required for the given transformed coordinates points (u0, v0), (u1, v1) and (u2, v2), the simultaneous equations (6) instead of the equations (5) can be solved.

$$(x0, y0)=(Au0+Bv0+E, Cu0+Dv0+F)$$

$$(x1, y1)=(Au1+Bv1+E, Cu1+Dv1+F) \quad (6)$$

$$(x2, y2)=(Au2+Bv2+E, Cu2+Dv2+F)$$

Hereinafter the following case is discussed: a coordinates data comprises the coordinates points of "N" pieces of pixels, and differential values of the "N" pieces coordinates points transformed by the predetermined linear polynomial. When the predicted values for obtaining a difference are the coordinates points of "N" pieces pixels, the transformation parameter is produced through the following steps: first, in the transformation parameter producing part 806, add the differential values between the coordinates points of the "N" pieces pixels and the "N" pieces of transformed coordinates points, and then, producing the transformation parameters using the "N" pieces pixels coordinates points and the added "N" pieces transformed coordinates points. When the predicted values for obtaining the difference are the transformed coordinates points of the "N" pieces pixels of the previous frame, in the transformation parameter producing part 806, the transformed coordinates points of the "N" pieces pixels in the previous frame are added to the differential values to restore N transformed coordinates points of the current frame. The transformation parameters are then calculated from the "N" pieces pixels coordinates points and the restored N transformed coordinates points. The restored N transformed coordinates points are stored as prediction values for the preceding frames.

Next, the following case is discussed here: the coordinates data is the "N" pieces coordinates points transformed from a predetermined "N" pieces coordinates points by a predetermined linear polynomial. It is not necessarily to transmit the "N" pieces coordinates points because they are predetermined. In the transformation parameter producing part 806, the transformation parameters are produced using the coordinates points of the predetermined "N" pieces pixels and the transformed coordinates points.

Then the following case is considered where: the coordinates points are the differential values of the "N" pieces of transformed coordinates points obtained by applying the predetermined linear polynomial function to the predetermined "N" pieces coordinates points. In the case where prediction values for obtaining the difference are the predetermined "N" pieces coordinates points, in the transformation parameter producing part 806, the predetermined "N" pieces coordinates points are added to the difference to retrieved the transformed coordinates points. Then the transformation parameters are calculated from the predetermined "N" pieces coordinates points and the transformed coordinates points thus retrieved. When the predicted values for obtaining the difference are the transformed coordinates points of the "N" pieces pixels of the previous frame, in the transformation parameter producing part 806, the transformed coordinates points of the "N" pieces pixels in the previous frame are added to the differential values to retrieve N transformed coordinates points of the current frame. The transformation parameters are then calculated from the "N" pieces pixels coordinates points and the retrieved N transformed coordinates points. The retrieved N transformed coordinates points are stored as prediction values for the preceding frames.

Figure 9:
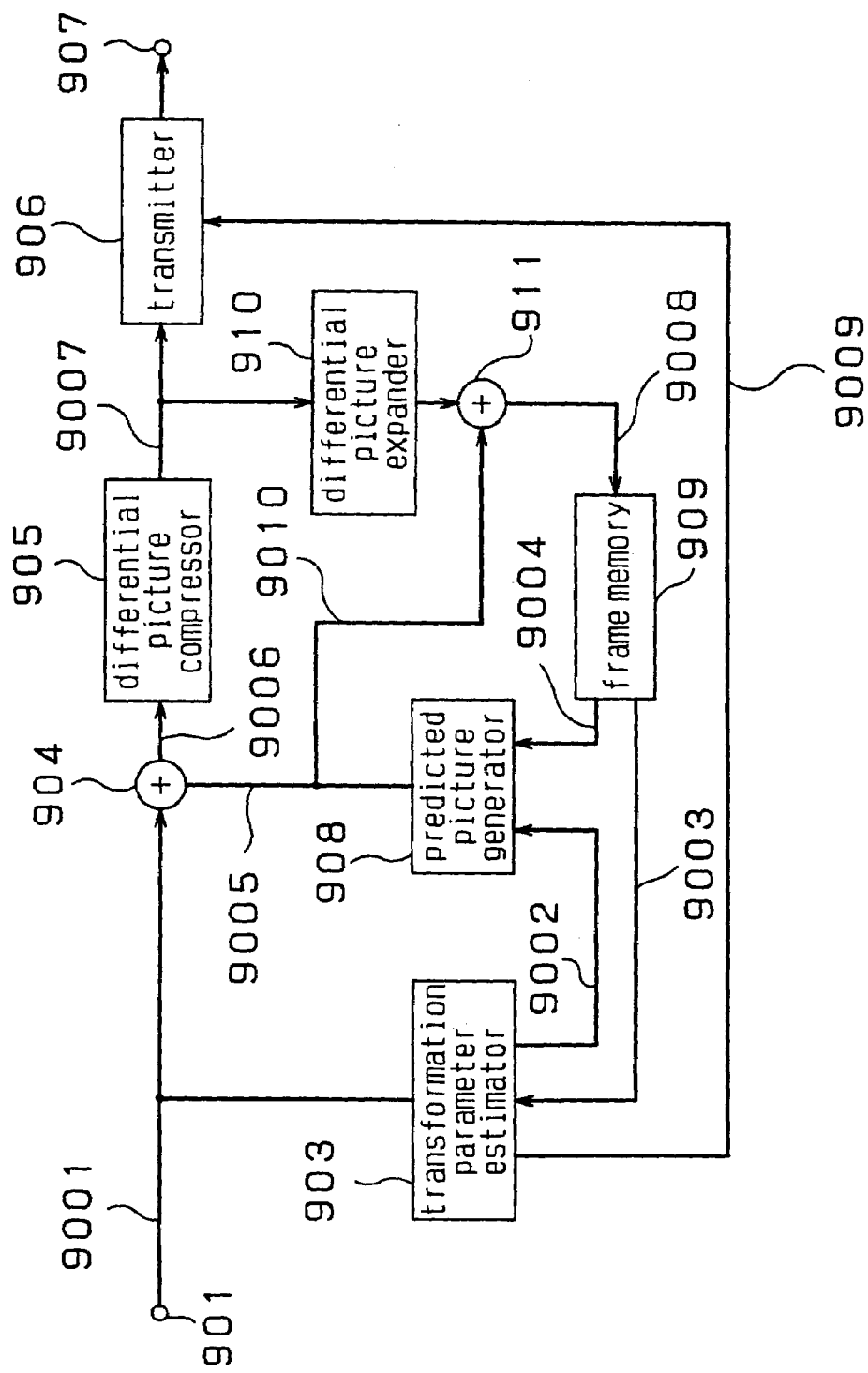
FIG. 9 is a block diagram depicting a digital picture encoder used in the third exemplary embodiment.

FIG. 9 is a block diagram depicting an encoder utilized in the third exemplary embodiment of the present invention. The encoder comprises the following elements: input terminal 901, transformation parameter estimator 903, predicted picture generator 908, first adder 904, differential picture compressor 905, differential picture expander 910, second adder 911, frame memory 909 and transmitter 906. First, input a digital picture to the input terminal 901. Second, in the transformation parameter estimator 903, estimate a transformation parameter using a picture stored in the frame memory and the input digital picture. The estimating method of the Affine parameters was already described hitherto.

Instead of the picture stored in the frame memory, an original picture thereof can be used. Third, send the estimated transformation parameters to the predicted picture generator 908 via a line 9002, and send the coordinates data transformed by the transformation parameters to the transmitter 906 via a line 9009. The coordinates data can be in a plurality of forms as already discussed. Input the estimated transformation parameters and the picture stored in the frame memory 909 to the predicted picture generator 908, and then produce the predicted picture based on the estimated transformation parameters. Next, in the first adder 904, find a difference between the digital picture and the predicted picture, then compress the difference into a differential compressed data in the differential picture compressor 905, then send this to the transmitter 906. In the differential picture compressor 905, apply DCT to the compressed data and quantize the data, at the same time, in the differential picture expander 910, the inverse quantization and inverse DCT is applied. In the second adder, the expanded differential data is added to the predicted picture, and the result is stored in the frame memory. In the transmitter 906, encode the differential compressed data, quantized width and the coordinates data, then multiplex them, and transmit to store them.

(Embodiment 4)

Figure 10:
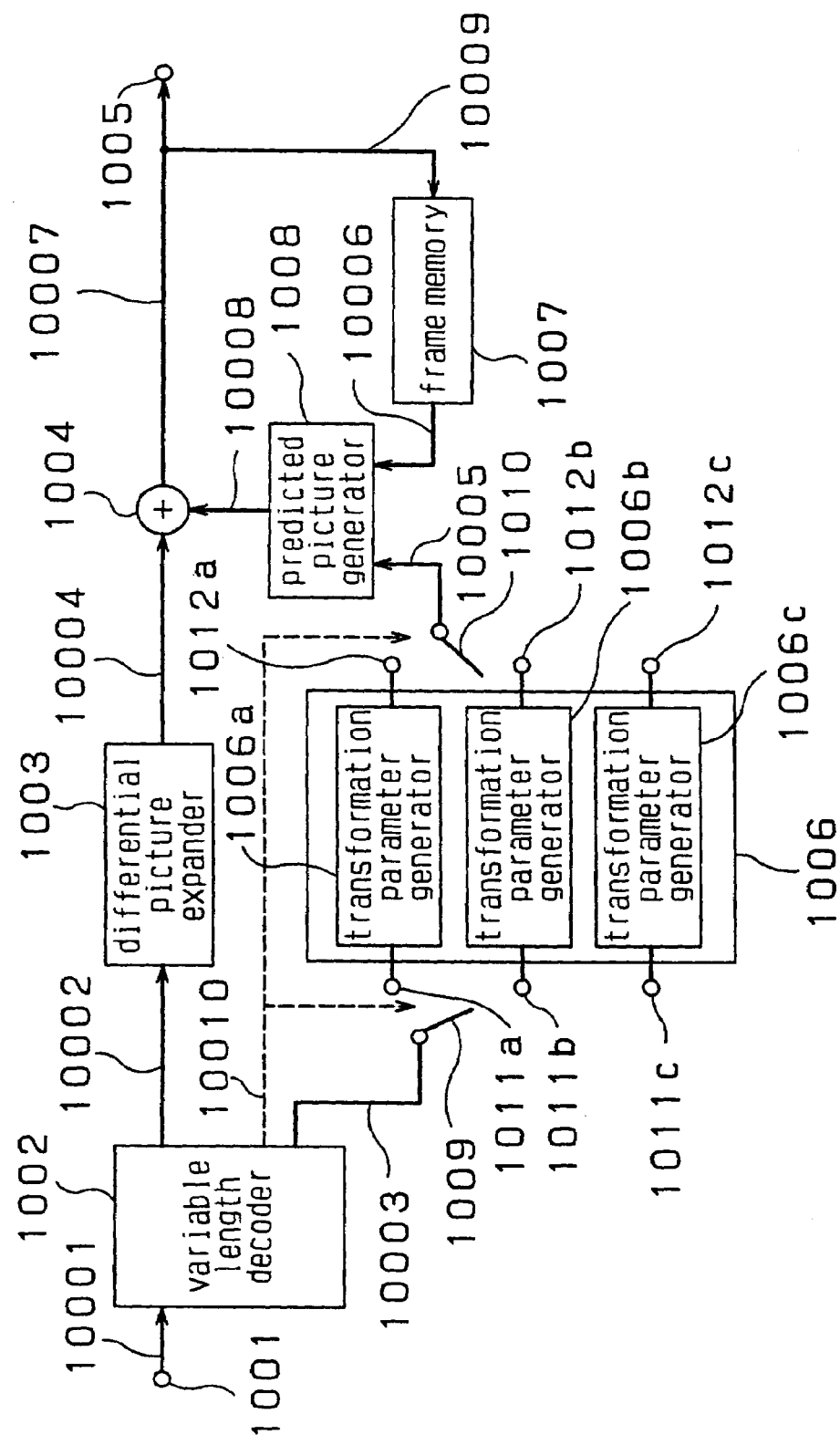
FIG. 10 is a block diagram depicting a digital picture decoder used in the fourth exemplary embodiment.

FIG. 10 depicts a digital picture decoder utilized in a fourth exemplary embodiment. The decoder comprises the following elements: input terminal 1001, variable length decoder 1002, differential picture expander 1003, adder 1004, transformation parameter generator 1008 and frame memory 1007. Since the basic operation is the same as that described in FIG. 8, only the different points are explained here. The transformation parameter generator 1006 can produce plural types of parameters. A parameter producing section 1006a comprises means for producing the parameters (a, e, d, f) expressed by the equation (2), a parameter producing section 1006b comprises means for producing the parameters (a, b, e, c, d, f) expressed by the equation (3), and a parameter producing section 1006c comprises means for producing the parameters (g, p, r, a, b, e, h, q, s, c, d, f) expressed by the equation (4). The equations (2), (3) and (4) require two coordinates points, six coordinates points and 12 coordinates points respectively for producing parameters. These numbers of coordinates points control switches 1009 and 1010 via a line 10010. When the number of coordinates points are two, the switches 1009 and 1010 are coupled with a terminals 1011a and 1012a respectively, and the coordinates data is sent to the parameter producing section 1006a via a line 10003, and simultaneous equations are solved, thereby producing the parameters expressed by the equation (2), and the parameters are output from the terminal 1012a. When the number of coordinates points are three and six, respective parameter producing sections 1006b and 1006c are coupled to terminals 1011b, 1012b and terminals 1011c, 1012c respectively. According to the information about the number of coordinates points, a type of coordinates data to be transmitted can be identified, and whereby the transformation parameters can be produced responsive to the numbers. The form of the coordinates data runs through the line 10003 has been already discussed. When the right sides of the equations (2)–(4), i.e., (x, y) are known quantities, it is not necessary to transmit these values, therefore, the number of coordinates points running through the line 10010 can be one for the equation (2), three for (3) and six for (4). Further the transformation parameter producing sections are not limited to three but can be more than three.

(Embodiment 5)

Figure 11:
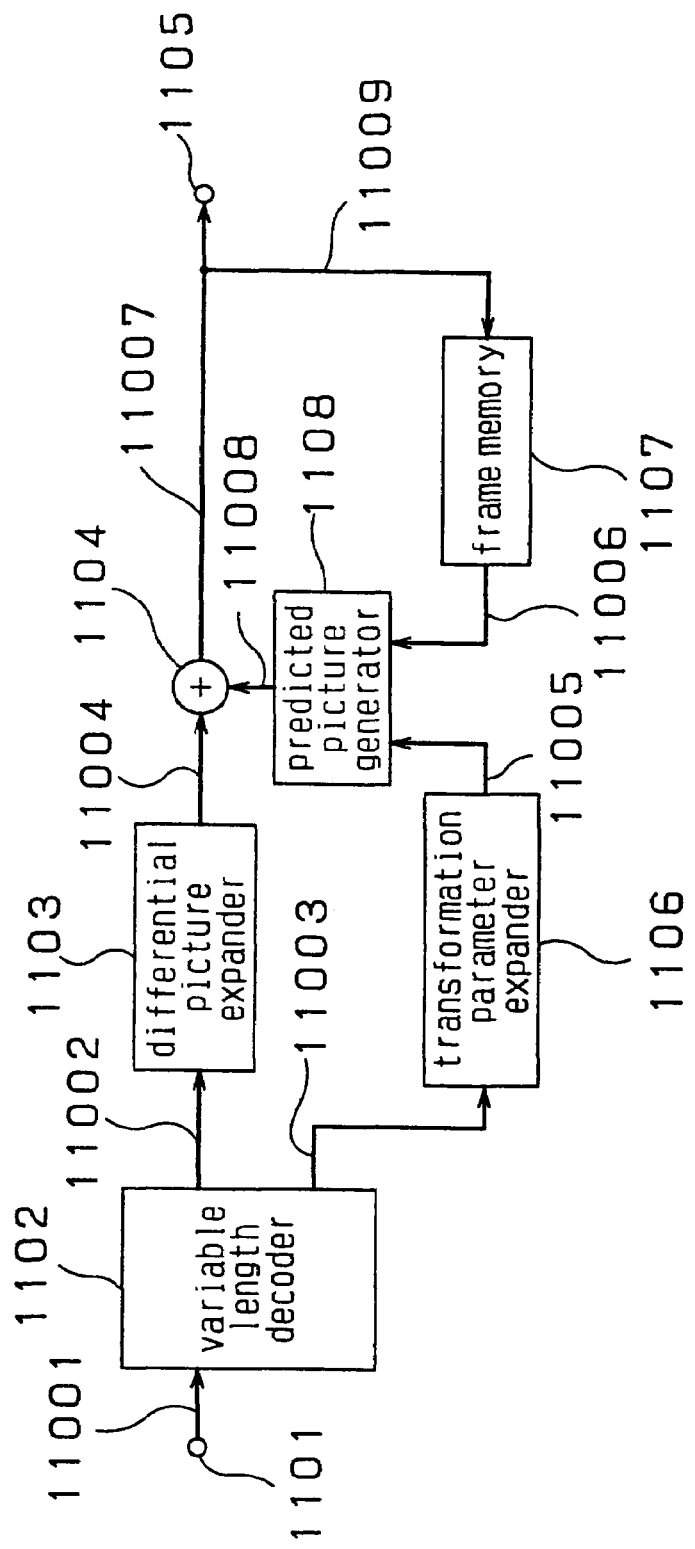
FIG. 11 is a block diagram depicting a digital picture decoder used in the fifth exemplary embodiment.
Figure 12:
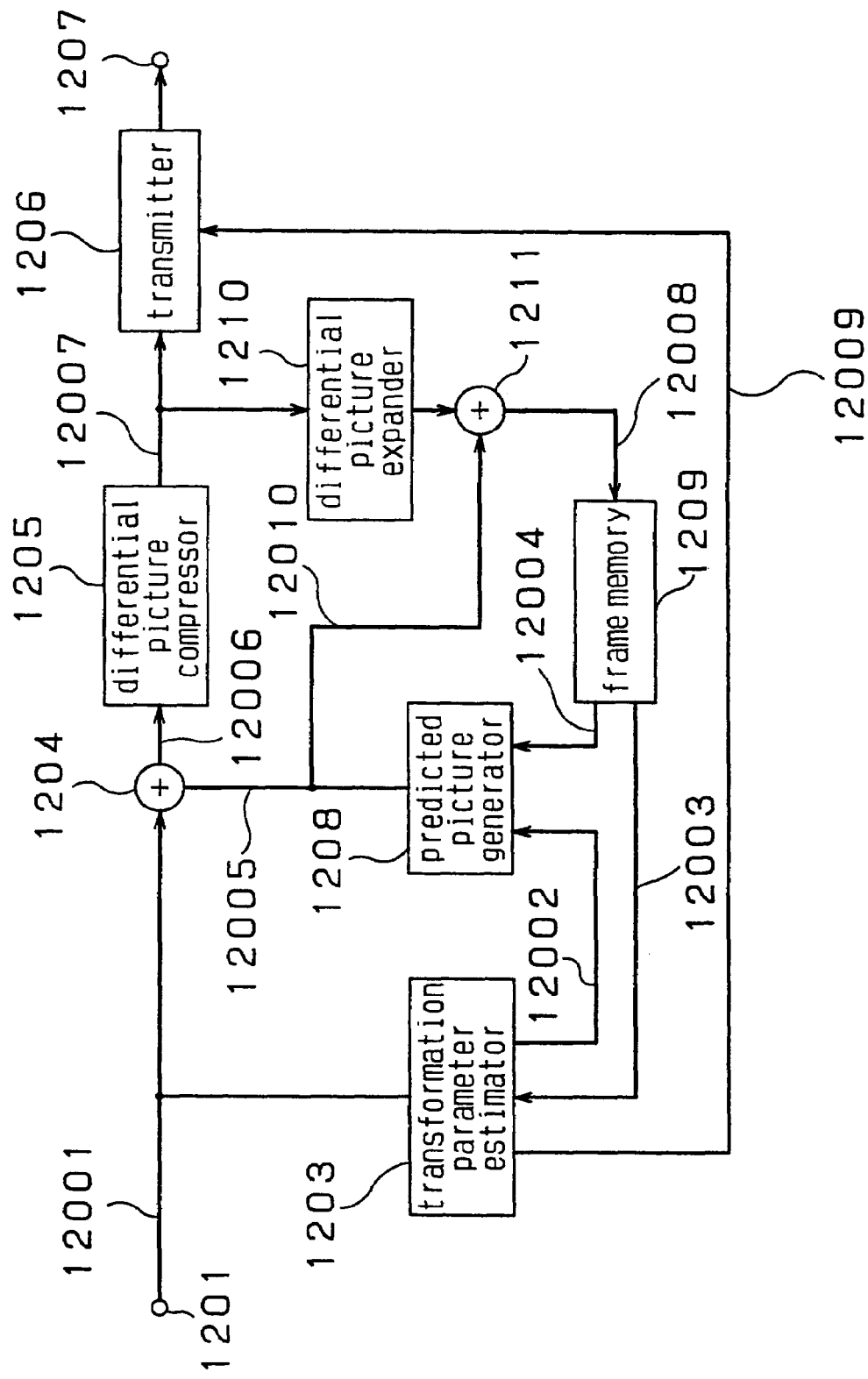
FIG. 12 is a block diagram depicting a digital picture encoder used in the fifth exemplary embodiment.

FIG. 11 and FIG. 12 are block diagrams depicting a digital picture decoder and encoder respectively. These drawings are basically the same as FIGS. 8 and 9, and yet, there are some different points as follows: instead of the transformation parameter generator 806, a transformation parameter expander 1106 is employed, and an operation of a parameter estimator 1203 is different from that of the parameter estimator 903. These different points are discussed here. In the transformation parameter 1203 of FIG. 12, first, estimate the transformation parameter, then, multiply it by a picture size, second, quantize the multiplied transformation parameters, and send it to the transmitter 1206 via a line 12009. The transformation parameter is a real number, which should be rounded to an integer after being multiplied. In the case of the Affine parameter, the parameters (a, b, c, d) should be expressed with a high accuracy. Parameters of vertical coordinates "a" and "c" are multiplied by a number of pixels "V" in the vertical direction, and parameters of horizontal coordinates "b" and "d" are multiplied by a number of pixels "H" in the horizontal direction. In the case of equation (4) having a square exponent term, the picture size for multiplying can be squared ($H^2$, $V^2$, HV.) In the transformation parameter expander 1106 of FIG. 11, the multiplied parameter is divided, and the parameter is reproduced. In the transformation parameter estimator 1203 of FIG. 12, estimate the transformation parameters, and then find the maximum value of the transformation parameter. An absolute maximum value is preferable. The transformation parameters are normalized by an exponent part of the maximum value (preferably an exponent part of a second power), i.e., Each transformation parameter is multiplied by a value of the exponent part. Send the transformation parameters thus normalized and the exponent to the transmitter 1206, and transform them into a fixed length code before transmitting. In the transformation parameter expander 1106 of FIG. 11, divide the normalized parameters by the exponent, and expand these to the transformation parameters. In the case of the Affine parameters (a, b, c, d), find the maximum value among (a, b, c, d.) In this case, the parameter of parallel translation (e, f) can be included; however, since these parameters typically have a different number of digits from the Affine parameters, it had better not be included. The same practice can be applied to the parameters of equation (4), and it is preferable to normalize a square exponent (second order) term and a plain (first order) term independently, but it is not limited to this procedure.

In all the above exemplary embodiments, the descriptions cover the cases where a differential picture is non-zero; however, when the differential picture is perfectly zero, the same procedure can be applicable. In this case, a predicted picture is output as it is. Also the descriptions cover the transformation of an entire picture; however, the same description is applicable to a case where two dimensional or three-dimensional picture is resolved into plural small regions, and one of transforms including the Affine transform is applied to each small region.

INDUSTRIAL APPLICABILITY

According to the present invention as described in the above embodiments, pictures of different sizes are transformed into the same coordinates system, and motions thereof are detected, and thus a predicted picture is produced, thereby increasing an accuracy of a motion detection, and at the same time, decreasing coded quantity of motion vectors. On the decoder side, a transformation parameter is obtained from coordinates data, which results in producing a highly accurate transformation parameter and a highly accurate predicted picture. Further, normalizing the transformation parameter as well as multiplying it by a picture size can realize a transmitting of the parameter with a responsive accuracy to the picture. And also, the transformation parameter can be produced responsive to a number of coordinates data, which can realize an optimal process of producing the transformation parameter, and an efficient transmission of the coordinates data.

The invention claimed is:

1. A predicted decoding method for decoding a bitstream data obtained by encoding a target image to be encoded referring to a reference image, the predicted decoding method comprising:
    (a) extracting from the bitstream data, coordinates point data indicating frame coordinates points of the reference image, coordinates number data indicating a number of the frame coordinates points and a compressed image signal related to a target image to be decoded;
    (b) selecting an image transformation parameter used for obtaining a predicted image, based on the extracted coordinates number data;
    (c) obtaining the predicted image from the reference picture, based on the selected image transformation parameter and the extracted coordinate point data;
    (d) obtaining a decompressed differential image by decoding the compressed image signal; and
    (e) reproducing a reproduced image by summing the predicted image and the decompressed differential image.

* * * * *

UNITED STATES PATENT AND TRADEMARK OFFICE
CERTIFICATE OF CORRECTION

| | |
|---|---|
| PATENT NO. | : 7,016,544 B2 |
| APPLICATION NO. | : 10/807061 |
| DATED | : March 21, 2006 |
| INVENTOR(S) | : Choong Seng Boon |

It is certified that error appears in the above-identified patent and that said Letters Patent is hereby corrected as shown below:

<u>Title Page, Item (56) References Cited, OTHER PUBLICATIONS</u>
Change "inlcuding " to --including--

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,016,544 B2  Page 1 of 1
APPLICATION NO. : 10/807061
DATED : March 21, 2006
INVENTOR(S) : Choong Seng Boon It is certified that error appears in the above-identified patent and that said Letters Patent is hereby corrected as shown below:

<u>Column 16</u>
Line 45, change "coordinate" to --coordinates--

Signed and Sealed this

Fourteenth Day of August, 2007

JON W. DUDAS
*Director of the United States Patent and Trademark Office*